Sept. 22, 1970 A. M. ADELSON ET AL 3,530,312

TOUCH RESPONSIVE MOMENTARY SWITCH CIRCUIT

Filed Feb. 14, 1969

INVENTORS
ALEXANDER MICHAEL ADELSON
JEROME SWARTZ

BY

ATTORNEYS

United States Patent Office 3,530,312
Patented Sept. 22, 1970

3,530,312
TOUCH RESPONSIVE MOMENTARY SWITCH CIRCUIT

Alexander M. Adelson, Elmsford, and Jerome Swartz, Stony Brook, N.Y., assignors to Hall-Barkan Instruments, Inc., Tuckahoe, N.Y., a corporation of New York Continuation-in-part of application Ser. No. 580,056, Sept. 16, 1966. This application Feb. 14, 1969, Ser. No. 799,163
Int. Cl. H03k *17/00*
U.S. Cl. 307—252 11 Claims

ABSTRACT OF THE DISCLOSURE

A touch responsive switching device made up of a pair of glow discharge tubes, a load, a source of electric energy having a grounded terminal connected in circuit with the load and the pair of glow discharge tubes. The pair of glow discharge tubes have a common junction. These tubes have a high impedance in the OFF state. A touch element is connected to the common junction and is adapted to receive a voltage pick-up signal from an external body when contacted thereby. When this occurs the impedance of said glow discharge tubes is substantially reduced in response to the voltage pick-up signal to switch the glow discharge tubes from their high impedance state to an impedance level between their non-self-maintained discharge point and the beginning of the normal glow discharge region.

CROSS-REFERENCE TO RELATED APPLICATION

This application is a continuation-in-part of our co-pending application Ser. No. 580,056 filed Sept. 16, 1966 and is an improvement on the invention in our co-pending application Ser. No. 572,092 filed Aug. 12, 1966.

BACKGROUND OF THE INVENTION

Field of the invention

A touch responsive momentary switch circuit employing a pair of glow discharge tubes in the activating leg of the circuit.

Description of the prior art

Insofar as the inventors are aware, there is no relevant prior art. The closest art of which knowledge is had is a switch circuit in which a glow discharge tube is located in the activating leg. However, in such a circuit the glow discharge tube is activated to the normal glow discharge region, this being quite different from the circuit of the present invention.

SUMMARY OF THE INVENTION

This invention relates broadly to electronic switches and more particularly to a solid state switch circuit which is actuated to the active state to close a load circuit in response to the touch of a human operator or the electrical equivalent thereof.

The main object of the present invention is to provide a construction of touch responsive switching circuit which operates directly on the voltage pick-up of the human body, or its electrical equivalent, and does not utilize the body of the operator as an element in a voltage divider circuit of a triggering circuit, or as an impedance contacting any "hot" (voltage) point created by feedback from the internal power supply, such that changes in the human body due to ambient conditions will not affect switching circuit operations as in prior art devices.

Another object of the invention is to provide a construction of solid state switching circuit which is independent of frequency, voltage value, (other than threshold value or input signal) and regulation of the power supply such that variations in these circuit parameters have no effect on the switching operation and efficiency thereof.

Another object of the present invention is to provide a novel construction of triggering circuit in a touch-responsive switching circuit, operating on the principle of a drastic impedance level change in the triggering circuit initiated by touch of a human operator, to operate the switching circuit.

Moreover, it is an object of the invention to provide a construction of touch-responsive switch having relatively few components, which is simple and compact in construction, economical to manufacture and compatible with mass production techniques.

The switch of the present invention utilizes a highly current-sensitive, semiconductor element, such as a semiconductor controlled rectifier, as a switching element which is responsively triggered into a state of conduction upon contact by the finger of a human operator, or some other electrical equivalent external operator, with a novel circuit containing balanced network glow discharge devices connected in the trigger circuit of the semiconductor controlled rectifier. The basic mode of touch operation of the switch depends essentially upon the capacitively-coupled voltage pick-up of the human body, 60 cycles typical.

A further object of the invention is to provide an economical construction of compact semiconductor switches of the half-wave and full-wave type which are momentary in operation, that is, are switched to the conducting state when touched by the human operator and immediately switched to the nonconducting state when contact with the human operator is broken.

Another object of the present invention is to provide a construction of electronic switch which has no moving parts, and an indefinitely long operating lifetime as established by well beyond 20,000,000 firing or cycling operations of the switch of the invention with no appreciable change in reliability or performance. In addition, the switch has a switching time in the microsecond range.

Other and further objects of the invention are set forth more fully in the specification hereinafter following, and still others will become apparent to one skilled in the art from the following specification.

BRIEF DESCRIPTION OF THE DRAWINGS

In the accompanying drawings in which are shown various possible embodiments of the invention.

DESCRIPTION OF THE PREFERRED EMBODIMENTS

Figure 1:
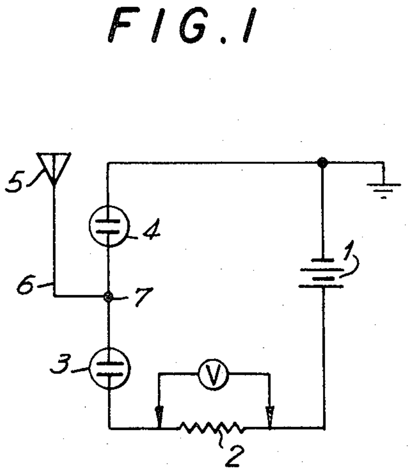
FIG. 1 is an electrical schematic diagram showing a circuit illustrating the present invention in its simplest form and the principle of operation of the present invention.

Referring to the drawings in greater detail, FIG. 1 shows a simple electrical schematic diagram of a neon bulb circuit illustrated for purposes of explaining the principle of operation of the circuit of the present invention. In this circuit a battery 1, such as a 24 volt DC battery, having one terminal connected to ground, is connected through its other terminal in series with a resistance 2 and a pair of neon glow discharge devices 3 and 4, with the final terminal of neon device 4 returned to ground. For purposes of the present illustrative circuit, glow discharge devices 3 and 4 are of the variety having a fairly low breakdown voltage, e.g., 55 volts, but the particular type of glow discharge device is not particularly critical for circuit operation. Resistance 2 is of approximately 22 megohms. An antenna element 5 comprising a body portion of electrically conductive material which can assume many shapes, forms a touch responsive element for the circuit and is connected through conductor 6 to junction 7 at the common connection of the series connected glow discharge devices 3 and 4.

Figure 2:
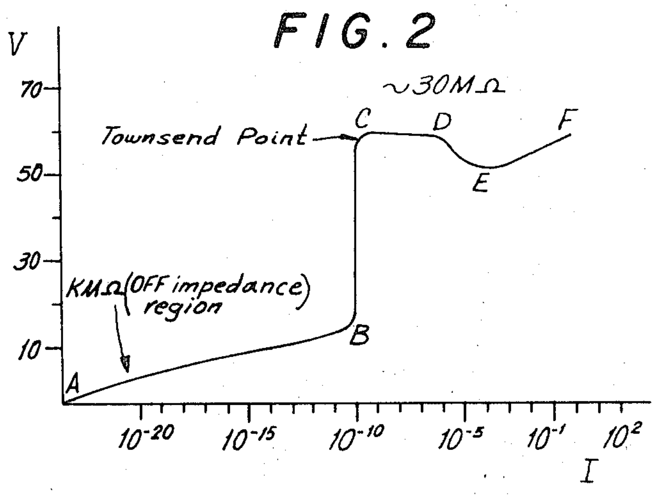
FIG. 2 is a plot showing the voltage-current characteristic curve of a neon glow discharge device.

With junction 7 in an unexcited state, that is, with no external body such as the human body or its electrical equivalent, touching touch responsive element 5, the neon glow discharge devices 3 and 4 are in their OFF-impedance kilomegohm state (appear as high impedances) since the then available voltage is insufficient to break them down and, hence, very little voltage (i.e., 0.1 volt) is recorded across resistance 2. When antenna or touch responsive element 5 is touched, an extremely visible glow discharge appears in the form of small point sources around both electrodes of glow discharge devices 3 and 4 and approximately 6 volts appear across resistance 2. At this time the neon glow discharge devices are between the points C and E on the voltage-current characteristic curve shown in FIG. 2. For convenience, these points are identified as following, in a manner which is well known to workers in the art: The point C is the Townsend discharge point, i.e., phrased differently, the non-self-maintained discharge point; the point E is the beginning of the zone E–F, this zone being the normal glow discharge region which is conventionally utilized as the breakdown region employed for everyday operation of a neon glow discharge device. It is emphasized that the devices are "between" the two points mentioned, that is to say, above C and below E. The voltage pick-up from the body applied to junction 7 has initiated a drastic impedance change in the neons, for instance from approximately a 2K megohm range to a 30 megohm range. Thus:

$$\frac{22\ M\Omega}{22\ M\Omega+2\times R_{neon}M\Omega}=\frac{6\ v.}{24\ v.}=\frac{1}{4}$$

so that $2R_{neon}=66\ M\Omega$, and $R_{neon}=33\ M\Omega$, where $R_{neon}$ is the resistance of one glow discharge device. Thus a factor of 30 is the decrease in impedance of the neon due to the human body signal pick-up applied to junction 7.

When the value of resistance 2 is 44 megohms, with all other circuit parameters remaining the same, approximately 9 volts is measured across resistor 2 when touch responsive element 5 is contacted by the human body, or other electrical equivalent external operator, to apply the body voltage pick-up signal to junction 7. In this case, $2R_{neon}\sim 73\ M\Omega$, and $R_{neon}\sim 36.5\ M\Omega$, still being below the point E.

Figure 3:
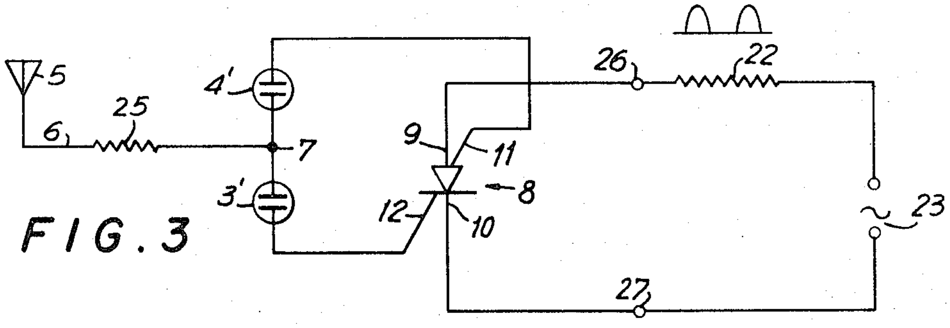
FIG. 3 is an electrical schematic diagram of a half-wave, touch responsive, AC momentary switch circuit according to the invention.

A half-wave, low power, touch actuated AC momentary switch circuit according to the invention is shown in FIG. 3 wherein a four-layer semiconductor element 8, such as a semiconductor controlled rectifier (SCR), having an anode 9, cathode 10, anode gate terminal 11, and cathode gate terminal 12, is connected in series circuit through anode 9 and cathode 10 with the load 22 to be energized by the switching circuit and an AC power source 23, which can be normal AC line power. This is a two wire solid state switch with the two output terminals for connecting the switch into the circuit in which it is utilized indicated at 26 and 27. This switch circuit as well as the other switch circuits of the invention disclosed herein require no external power other than the power with which the switch is placed in series and is thus expected to control.

Any of several semiconductor devices may be utilized in the switch circuit of the invention as long as it has the characteristic of sufficiently high sensitivity (current and/or voltages) associated with the gates 11 and 12 and the impedances of the input circuits are high. Experience has shown, for example, that a 3N84 controlled rectifier operates extremely well in the circuit of the invention because of its extremely sensitive control gate characteristics, and is also desirable because of its relatively low cost. Throughout the specification controlled rectifier 8 will be referred to as SCR 8 but it is to be understood that this reference also includes other semiconductor components which will operate in the circuit.

A glow discharge device or neon bulb 3′ is connected between cathode gate 12 and junction 7. A comparable glow discharge device or neon bulb 4′ is connected between junction 7 and anode gate 11, to form a balanced network configuration. Touch responsive element or antenna 5 is then connected by conductor 6 and resistor 25 to junction 7. Resistor 25 is approximately 330K and it is basically in the circuit to protect the human operator in case the switch circuit is not connected in proper manner to the supply source so the operator has resistor 25 and the high impedance of one of the neon bulbs in series between himself and the power source. This element therefore is basically a precautionary or safety device and in addition it prevents damage to SCR 8 from accidental short-circuiting with a floating potential.

Correlating the circuit of FIG. 3 with the circuit of FIG. 1, it will be noted that the voltage source 1, of FIG. 1, is replaced by the substantially back biased anode gate to cathode gate 11–12, diode reverse voltage of SCR 8, in the circuit of FIG. 3. When touch response element 5 is touched with the finger, the omnipresent voltage pick-up of the human body normally in the range of 1 to 5 volts, 60 cycles typical, from ambient conditions of the surrounding vicinity is applied to junction 7 of the necessary balance neon bulbs 3′ and 4′ and this signal initiates a drastic change in the impedance of the neon bulbs 3′ and 4′, as previously indicated from the high OFF-impedance kilomegohm state to the lower impedance state between the non-self-maintained discharge point and the beginning of the normal glow discharge region. Normally the anode gate 11 to cathode gate 12 impedance seen is in the kilomegohm range, and the SCR elements are in equilibrium condition, with no current flow in the circuit connecting anode gate 11 and cathode gate 12, so that breakdown cannot occur and the SCR 8 is OFF. After junction 7 is triggered by a touch, the dynamic state of the neons 3′ and 4′ changes due to this triggering and due to the decrease in the neon impedances in the circuit current flow in the microamp range is initiated in the anode gate 11 to cathode gate 12 circuit through the neons 3′ and 4′ causing SCR 8 to fire, that is, switch to the ON state. This is a half-wave switching circuit and simultaneously requires (1) a gate drive signal on gate 12 in phase with (2) the power supply signal on the anode to maintain the SCR ON. With the finger maintained in contact with element 5, when the AC source swings negative on anode 9 the SCR switches OFF, even though current continues to flow in the anode gate-to-cathode gate series circuit through neons 4′ and 3′. As soon as the AC current source swings positive on anode 9, the SCR again turns ON, as long as the finger is maintained in contact with element 5. It can thus be appreciated that this is a half-wave momentary switch and half-wave current excitation appears across load 22. When the finger is removed from element 5, the SCR turns OFF until it is again contacted by the human body or its electrical equivalent.

Figure 4:
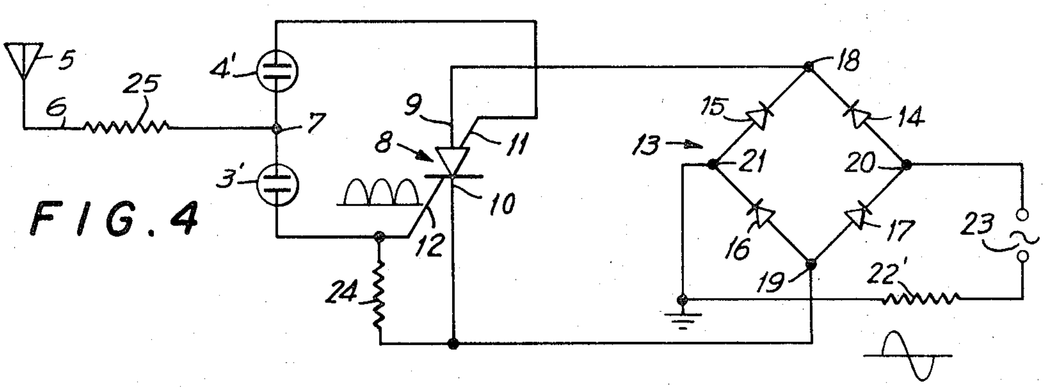
FIG. 4 is an electrical schematic diagram of a full-wave, touch responsive, AC momentary switching circuit according to the invention.

A full-wave, low power, touch actuated AC momentary switch circuit according to the invention is shown in FIG. 4 wherein four-layer semiconductor element or SCR8, is connected across a full-wave bridge circuit indicated generally at 13 consisting of diodes 14, 15, 16 and 17 connected in the usual manner. Anode 9 is connected to terminal 18 of the bridge circuit while cathode 10 is connected to terminal 19 thereof. Terminals 20 and 21 of the full-wave bridge circuit, which represent the output terminals of this two-wire switch, are connected in series with the load 22′ to be energized by the switching circuit, and the AC power source 23. A resistor 24 may be connected between SCR cathode gate 12 and cathode 10, and the remainder of the circuit with the glow discharge devices or neon bulbs 3′ and 4′ in the SCR triggering circuit is the same as in the circuit of FIG. 3. Resistor 24 is an auxiliary bleeder resistor which adds a bit of negative bias stability to the circuit.

Commutation in AC circuits is a natural phenomena and obtaining circuit HOLD-ON is the obvious problem to be solved. ON triggering in AC SCR circuits generally requires synchronization of the triggering signal to the line frequency, or some other external synchronization technique to not only trigger but continue the firing of the SCR past the AC zero crossing point and thus stay ON every cycle. In the present invention an internal HOLD-ON technique is provided to counter the commutating effect of the full-wave rectified AC power from bridge circuit 13 as it approaches zero. Usual external synchronization design solutions are generally complicated and expensive. In the present invention the triggering circuit of the SCR operates in the same manner as described in connection with FIG. 3 and full-wave AC switch operation is accomplished by the use of a constant current trickle signal in the anode gate 11 to cathode gate 12 through the neon bulbs 3′, 4′, which current trickle is initially established and maintained by a touch excitation of junction 7. The constant trickle current to gate 12 of SCR 8 maintains the SCR ON until the operator's finger is removed from touch responsive element 5 at which time the commutating effect of the full-wave AC power supply turns SCR 8 OFF to give the full-wave momentary switching action.

With the SCR ON, on the positive half-cycle of the AC current source 23, current flows through terminal 20, diode 14, terminal 18, SCR 8, terminal 19, diode 16, terminal 21, and load 22′ back to the source. On the negative half-cycle of the AC current source, current flows through load 22′ terminal 21, diode 15, terminal 18, SCR 8, terminal 19, and diode 17 back to the other side of source 23. As long as the operator's finger is in contact with element 5 and the supply voltage from fullwave bridge 13 is non-negative, the circuit stays ON and the entire sinusoidal input voltage of source 23 momentarily appears across load 22′, thus providing a full-wave AC momentary switching action relative to the load. SCR 8 switches OFF when the operator's finger is removed from element 5.

Figure 5:
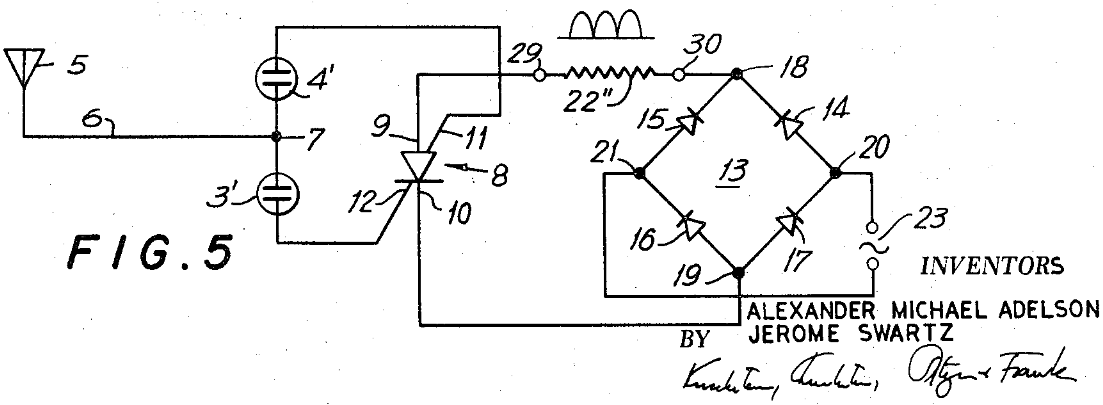
FIG. 5 is an electrical schematic diagram of a modified form of the switching circuit of FIG. 4.

It is to be noted that resistor 24 between cathode gate 12 and cathode 10, and resistor 25, are not essential to circuit operation, and for this reason have been eliminated from FIG. 5.

A modified form of the circuit of FIG. 4 is shown in FIG. 5 with the circuits being identical with the exception of load 22″ being placed in series with SCR 8 when a full-wave rectified output is desired across the load. The basic circuit operation is the same as explained in connection with the circuit of FIG. 4 and further explanation would be repetitious. This form of the switch of the invention is a four wire switch, rather than a two wire switch as in the other forms of the invention, since it has four output terminals, 20 and 21 for connection to the power source and 29 and 30 for connection to the load 22″.

While the invention has been shown and described in certain preferred embodiments, it is realized that modifications can be made without departing from the spirit of the invention, and it is to be understood that no limitations upon the invention are intended other than those imposed by the scope of the appended claims.

What is claimed as new and desired to secure by Letters Patent of the United States is as follows:

1. A touch responsive switching circuit comprising, a pair of glow discharge devices, a load, a source of electrical energy having a grounded terminal connected in circuit with said load and said pair of glow discharge devices, said pair of glow discharge devices having a common junction and having high impedance in the OFF state, a touch element connected to said common junction and adapted to receive a voltage pick-up signal from an external body when contacted thereby, whereby the impedance of said glow discharge devices is substantially reduced in response to the voltage pick-up signal to switch the glow discharge devices from a high impedance state to a level between the non-self-maintained discharge point and the beginning of the normal glow discharge region.

2. A touch responsive switching circuit as set forth in claim 1 in which said pair of glow discharge devices comprise balanced neon bulbs responsive to switch to a conducting state when said touch element is contacted by a human finger.

3. A touch responsive switching circuit comprising: semiconductor means having at least an anode, a cathode, an anode gate electrode, and a cathode gate electrode; a source of electrical energy and a load connected in circuit with said anode and cathode; a pair of glow discharge devices connected in series circuit with said anode gate electrode and said cathode gate electrode; said pair of glow discharge devices having high impedance in the non-conducting state and a common series connection; a touch responsive element connected to the common series connection of said pair of glow discharge devices to receive through contact therewith by an external body a voltage pick-up signal, whereby in response to a said voltage pick-up signal the impedance of said pair of glow discharge devices is substantially reduced to a level between the non-self-maintained discharge point and the beginning of the normal glow discharge region sufficient to establish current flow in the anode gate to cathode gate series circuit switching said semiconductor means to a conducting state to energize said load.

4. A touch responsive switching circuit as set forth in claim 3 in which said pair of glow discharge devices comprise a pair of neon bulbs in a balanced network configuration.

5. A touch responsive switching circuit as set forth in claim 3 including a full-wave semiconductor bridge circuit having a pair of input terminals and a pair of output terminals, said pair of output terminals connected to said anode and cathode, and said pair of input terminals connected in series circuit with said load and said source of electrical energy, whereby current from said source of electrical energy is applied to said load while said touch responsive element is in contact with a human operator.

6. A touch responsive switching circuit as set forth in claim 3 in which said source of electrical energy is an AC source, and said AC source and said load are connected in series circuit with said anode and cathode, whereby half-wave excitation of said load is provided as long as a human operator is in contact with said touch responsive element.

7. A touch responsive switching circuit as set forth in claim 3 including a full-wave bridge circuit connected in circuit between said anode and cathode, and said source of electrical energy and said load to provide full-wave excitation of said load.

8. A touch responsive switching circuit as set forth in claim 3 in which said load and source of electrical energy are connected in series circuit with said anode and cathode, and said source of electrical energy including a full-wave bridge circuit, whereby full-wave rectified current is applied to said load as long as a voltage pick-up signal is applied to said touch responsive element.

9. A touch responsive switching circuit as set forth in claim 3 including a resistance connected between said touch responsive element and said common series connection of said pair of glow discharge devices.

10. A touch responsive switching circuit as set forth in claim 3 including a resistance connected between said cathode gate and said cathode.

11. A touch responsive switching circuit comprising a pair of normally high impedance means, a load, a source of electrical energy having a grounded terminal connected in circuit with said load and said pair of normally high impedance means, said pair of normally high impedance means having a common junction, at least one of said normally high impedance means comprising a glow discharge device having high impedance in the OFF state, a touch element connected to said common junction and adapted to receive a voltage pick-up signal from an external body when contacted thereby, whereby the impedance of said glow discharge device is substantially reduced in response to the voltage pick-up signal to switch the glow discharge device from a high impedance state to a level between the non-self maintained discharge point and the beginning of the normal glow discharge region so as to energize said load.

References Cited

UNITED STATES PATENTS

| | | |
|---|---|---|
| 2,021,034 | 11/1935 | Thompson. |
| 3,329,838 | 7/1967 | Meyers. |

DONALD D. FORRER, Primary Examiner

J. D. FREW, Assistant Examiner

U.S. Cl. X.R.

307—305; 315—362; 328—210, 211